United States Patent [19]
Eberly, Jr. et al.

[11] 3,758,600
[45] Sept. 11, 1973

[54] AROMATIZATION CATALYST AND PROCESS

[75] Inventors: Paul E. Eberly, Jr., Baton Rouge; Neville L. Cull, Baker, both of La.; Fred J. Buchmann, deceased, late of Baton Rouge, La. by Cordelia Atkeson Buchmann, legal represenative and heir

[73] Assignee: Esso Research and Engineering Company, Linden, N.J.

[22] Filed: Sept. 24, 1971

[21] Appl. No.: 183,381

[52] U.S. Cl............ 260/673.5, 260/680 R, 252/465
[51] Int. Cl................................................ C07c 5/27
[58] Field of Search.............. 260/673.5, 673, 680 R

[56] References Cited
UNITED STATES PATENTS
3,179,602  4/1965  Gremilliow......................... 252/465
3,074,893  1/1963  Ellert et al.......................... 252/465

Primary Examiner—Delbert E. Gantz
Assistant Examiner—Juanita M. Nelson
Attorney—Leon Chasan et al.

[57] ABSTRACT

An aromatization catalyst is provided comprising from about 0.5 to about 30 percent of a Group VI B metal oxide on a support comprising a mixture of titania and alumina, wherein said titania is present in amounts ranging from about 1 to about 60 percent by weight. The catalyst is employed to promote the conversion of paraffins, olefins, cycloparaffins, cycloolefins and mixtures thereof to aromatics by contacting said paraffins and/or olefins with said catalyst at temperatures ranging from about 400° to about 1200°F.

19 Claims, 2 Drawing Figures

RELATIVE ACTIVITY FOR 10% $Cr_2O_3$ ON $TiO_2/Al_2O_3$ CATALYSTS FOR HEXENE-1 AROMATIZATION AT 900°F.

AROMATIZATION OF HEXENE-1 AT 900°F. AND 0.7 W./hr./W. AT 1 ATM. $N_2$

INVENTORS.
Paul E. Eberly, Jr.
Fred J. Buchmann
Neville L. Cull

AROMATIZATION CATALYST AND PROCESS

This invention relates to an improved aromatization catalyst. More particularly, this invention relates to a catalyst system which effectively promotes the conversion of paraffins, olefins, cycloparaffins, cycloolefins and mixtures thereof to aromatics and which exhibits prolonged catalyst life.

Many refinery streams are generally blended to produce motor gasoline. The main components of a refinery gasoline pool, however, are catalytically cracked and virgin naphthas. The light olefins, especially propylene and butylene, are most often separated from these naphtha streams and catalytically polymerized to make gasoline. Nevertheless, these streams will contain a significant amount of higher olefins and diolefins. Olefins and diolefins can produce smog-forming compounds in internal combustion engines and as a consequence, can contribute to air pollution. Because of the relatively low octane number of the virgin naphtha component of the refinery gasoline pool, it is generally considered desirable to subject the blended streams to a reforming operation to raise the octane number. In the reforming operation, dehydrogenation, aromatization and isomerization occur. The resulting aromatics and highly branched paraffins that are obtained by catalytic reforming are valuable gasoline components because of their very high blending octane number. Unfortunately, such reforming catalysts are not particularly effective in converting olefins and diolefins to aromatics.

The present invention relates to an improved aromatization catalyst comprising from about 0.5 to about 30 percent by weight (based on total catalyst) of a Group VI B oxide impregnated on a support comprising a mixture of titania ($TiO_2$) and alumina ($Al_2O_3$), wherein said titania is present in amounts ranging from about 0.5 to about 75 wt.%, preferably from about 1 to about 60 percent by weight (based on total support).

A more complete understanding of the present invention will be obtained from the following detailed disclosure and drawings wherein.

Figure 1:
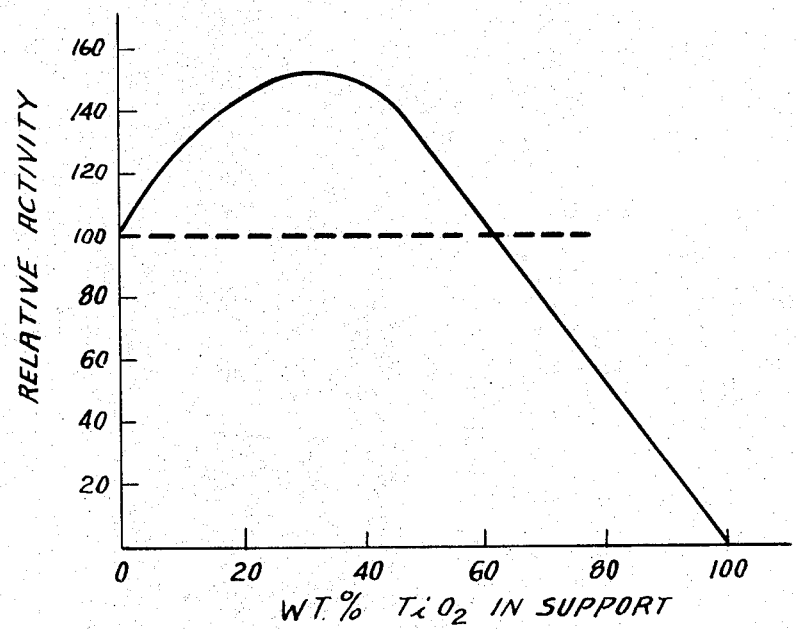
FIG. 1 is a graph showing the variation in relative activity of 10 percent $Cr_2O_3$ on $TiO_2/Al_2O_3$ supports for hexene-1 aromatization at 900°F. with increasing $TiO_2$ content.

Non-precious metal reforming catalysts have heretofore been employed comprising from about 1 to about 30 percent by weight of an oxide of a Group VI B metal impregnated on an alumina support. It has now been found that by incorporating from about 1 to about 60 percent by weight of titania into the support, the catalyst becomes highly effective in converting olefins and diolefins to aromatics. Moreover, the addition of titania to the alumina support has been found effective in substantially prolonging catalyst life. Additionally, mention of titania/alumina catalyst supports has been made in the prior art. For example, Ellert et al in U.S. Pat. No. 3,074,893 teach the use of chromia/titania cogels as supports for reforming catalysts. They also state that alumina can be added.

The supports of the present invention can be prepared by hydrolyzing mixtures of titanium alkoxides and aluminum alkoxides wherein the alkoxide groups each can contain from about two to about five carbon atoms. Hydrolysis can be conveniently accomplished in a one step procedure by contacting the alkoxides with neutral water or aqueous alcohol solutions at a temperature of about room temperature to 200°F., or preferably, 150°–200°F. The mixtures can contain sufficient titanium alkoxide so that the mixed oxide product contains from about 1 to about 60 percent by weight of titanium dioxide, preferably from about 15 to about 50 percent by weight of titanium dioxide and most preferably from about 25 to about 35 percent of titanium dioxide. After hydrolysis, the mixture can be recovered for subsequent impregnation with a Group VI B metal oxide. Although this impregnation can be done directly on the filtered product, it is preferable to dry and calcine the mixed oxide product. This calcination can be done in air at temperatures from 600° to 1200°F. for periods of time ranging from 2 to about 20 hours.

The mixed titania/alumina supports, prepared as described above, exhibit surface areas of at least about 200 meters²/gram and typically ranging from about 200 to about 400 meters²/gram. Preferably the support material has a surface area greater than about 225 meters²/gram. The surface areas are measured by the standard B.E.T. technique involving the adsorption of nitrogen at liquid nitrogen temperatures. The pore volumes of the support range from about 0.3 to about 1.75 cubic centimeters/gram. These volumes are measured by the amount of nitrogen adsorbed at liquid nitrogen temperature and near 1 atmosphere pressure. Even higher surface areas can be achieved by varying the support preparation parameters, notably gelatin time.

Typical catalyst oxides of Group VI B metals of the Periodic Table are principally the oxides of chromium, molybdenum and tungsten and mixtures thereof. Generally, these oxides are impregnated onto the support in amounts ranging from about 0.5 to about 30 percent by weight, preferably about 0.5 to 15 percent by weight, still more referably 0.5 to 10 percent by weight based on total catalyst. Impregnating the titania/alumina support with the Group VI B metal oxide rather than dispersing the material within the support structure as per U.S. Pat. No. 3,074,893 permits a much greater percentage of the metal oxide to participtate in the catalytic reaction. Impregnation of the support can be conveniently accomplished by immersing the support in an aqueous solution of the metal oxide or a derivative thereof. The Group VI B composition can subsequently be converted to the oxide during calcination. One technique found especially useful for impregnation is the incipient wetness technique. In this method, it is predetermed what volume of water is just sufficient to moisten the support uniformly and yet not have any extraneous liquid phase present. Knowing this volume, the liquid solution containing the metal oxide or derivative thereof is made up in sufficeint volume so that when applied to the supoort a uniformly moistened, consistent paste results.

Once the supports have been impregnated, they are again calcined in air at temperatures ranging from about 800°–1200°F. from a period of time ranging from about 2 to about 20 hours to obtain the improved aromatization catalysts of the present invention.

It has been found that the composition of the catalyst supports of the present invention is critical to obtaining maximum aromatization activity and extended catalyst life. Generally, it has been found that from about 1 to about 60 percent titania must be admixed with from about 40 to 99 wt.% alumina to obtain the benefits of the present invention. Preferably, the catalyst support contains from about 15 to about 50 percent titania, and most preferably, from about 25 to about 35 percent titania with the balance of the catalyst support being composed of alumina. Various other compositions may be incorporated in the catalyst; however, it is preferred that the support contain at least about 20 wt.% alumina, based on total support. As shown in FIG. 1, when titania is present in the support in amounts excessively greater than about 60 percent, the catalyst activity is not significantly greater than when a 100 percent alumina catalyst is employed.

The aromatization process of the present invention is especially effective in converting (a) open chian and cyclic olefinic aliphatic hydrocarbons having one or more ethylenic sites of unsaturation and having from about six to eighteen carbon atoms, (b) open chain and cyclic alkanes (paraffins) having from 6 to 18 carbon atoms, and (c) mixtures of said olefins and paraffins (aromatizable hydrocarbons) to aromatic hydrocarbons. The process can be employed with olefin and/or diolefin feed streams or with olefin-containing mixed refinery feed streams such as virgin or catalytic naphthas. Aromatic compounds may also be present in the process feed stock. Preferably the process feed stock is substantially sulfur-free.

The aromatization process is generally conducted at temperatures ranging from about 400° to about 1200°F., preferably 800°–1000°F. and most preferably from 850°–900°F. Pressures in the range of 0–300 psig., preferably from about 0–50 psig. are typically employed. This pressure can be autogenous or can be supplied by the addition of another gaseous substance. Since molecular hydrogen is a product of the reaction, it is sometimes preferred to employ inert gases such as nitrogen, methane, and the like. However, moderate pressures varying from 0 to 300 psig. hydrogen can be maintained in the reaction zone to suppress coke formation and prolong catalyst life. Typically, the temperature at which the aromatization process is carried out is increased with increasing hydrogen partial pressure. It is within the scope of this invention to adjust these operating variables such as temperature, pressure, feed rate, gas composition, etc. to secure the optimum conversion to aromatics for the particular feed in question.

The catalyst can be used in either a fixed bed or fluid bed operation with the feed stream being passed into contact with the catalyst at a space velocity of from about 0.05 to about 10 w/hr/w, i.e., pounds of feed per hour per pound of catalyst. Typically, the aromatization process is conducted using fixed bed techniques.

The catalyst can be periodically regenerated by heating the same to from about 800° to about 1200°F. for a period of time sufficient to burn deposited carbon off the catalyst. Generally, the regeneration is conducted in situ for a time period ranging from about 2 to about 20 hours. After regeneration, the catalyst can be reused. It has been found that the catalysts of the present invention exhibit effective aromatization activity for a significantly longer period of time than prior alumina supported catalysts. Thus, longer cycle times within the reactor can be tolerated without adverse effect on aromatic conversion activity. Thus, the catalysts of the present invention provide an effective means of converting the paraffin and/or olefin components of mixed refinery streams to aromatic materials or segregated olefin or paraffin streams to aromatic components thereby providing valuable gasoline blending components.

The following examples further illustrate the present invention. Unless otherwise specified, all percentages and parts are by weight.

EXAMPLE 1

The following example illustrates the preparation of catalysts of the present invention. It also demonstrates the existence of a critical range in the composition of the support for maximum performance of the material as an aromatization catalyst.

Catalyst supports are prepared by hydrolyzing aluminum sec.-butoxide, titanium tetraisopropoxide and varying mixtures thereof at 170°–190°F. using a neutral aqueous solution of isopropanol (65–70 percent by weight isopropanol). The support materials were then filtered, washed and preliminarily dried at 300°F. Thereafter, the supports were calcined in air at 1000°F. for a period of 16 hours. The resultant calcined supports exhibited surface area and pore volumes as summarized in Table I below.

TABLE I

Properties after Calcination at 1000°F. for 16 Hours

| Base Composition | Surface Area M.²/g. | Pore Volume cc./g. | Pore Radius A |
|---|---|---|---|
| 100% Al$_2$O$_3$ | 242 | 1.52 | 126 |
| 10% TiO$_2$–90% Al$_2$O$_3$ | 295 | 1.03 | 70 |
| 33% TiO$_2$–67% Al$_2$O$_3$ | 327 | 0.78 | 48 |
| 50% TiO$_2$–50% Al$_2$O$_3$ | 346 | 1.07 | 61 |
| 80% TiO$_2$–20% Al$_2$O$_3$ | 201 | 0.58 | 57 |
| 100% TiO$_2$ | 36 | 0.16 | 89 |

The pore radius was calculated by taking twice the pore volume and dividing by the surface area. The maximum surface area of 346 M.²/g. was obtained with the 50% TiO$_2$–50% Al$_2$O$_3$ support. Minimum pore radius of 48 A was obtained with the 33% TiO$_2$–67% Al$_2$O$_3$ support.

After calcination, 10 percent Cr$_2$O$_3$ (based on total catalyst) was impregnated upon each of the supports using the previously described incipient wetness technique using an aqueous solution of CrO$_3$. The catalysts were then again calcined at 1000°F. for 16 hours prior to testing for aromatization activity. After calcination, about 1 gram of catalyst was packed into a nominal ¼ inch stainless steel tube reactor which was placed in a sandbath maintained at 900°F. Nitrogen gas was passed over the catalyst at 40 cc./min. Then, the nitrogen was diverted through a saturator containing hexene-1 at 32°F. This resulted in a feed rate of hexene-1 of approximately 0.7 w/hr/w. The run was conducted for a two hour cycle time. The product stream was analyzed by gas chromatographic techniques. Results are tabulated in Table II.

TABLE II

Hexane-1 Aromatization at 900°F., 1 Atm. N$_2$ Pressure, 0.7 w/hr/w and 2 Hr. Cycle Time

| | Conversion to Benzene | Relative |

| Catalyst | Wt.% | Activity |
|---|---|---|
| 10% Cr$_2$O$_3$ on Al$_2$O$_3$ | 23.83 | 100 |
| 10% Cr$_2$O$_3$ on [10% TiO$_2$.90% Al$_2$O$_3$] | 30.92 | 130 |
| 10% Cr$_2$O$_3$ on [33% TiO$_2$.67% Al$_2$O$_3$] | 36.25 | 152 |
| 10% Cr$_2$O$_3$ on [50% TiO$_2$.50% Al$_2$O$_3$] | 30.57 | 128 |
| 10% Cr$_2$O$_3$ on [80% TiO$_2$.20% Al$_2$O$_3$] | 10.75 | 45 |
| 10% Cr$_2$O$_3$ on TiO$_2$ | 0.3 | 1.2 |

The 10% Cr$_2$O$_3$ on [33 TiO$_2$.67 Al$_2$O$_3$] gave the highest conversion to benzene of 36.25 percent. The conversion results obtained are transformed into relative activity values in Table II by treating the conversion to benzene with 10% Cr$_2$O$_3$ on 100% Al$_2$O$_3$ as 100. On this basis, the aforementioned catalyst having a support containing 33% TiO$_2$ exhibited a relative activity substantially higher than that of the catalyst containing no titania.

The variation in relative activity with increasing titania in the catalyst support, based on the data in Table II, is shown in FIG. 1. The existence of a critical range in the amount of titania in the support for maximum performance of the catalyst system as an aromatization catalyst is readily apparent. It can be seen that maximum activity is obtained when an alumina support contains titania in an amount up to about 60 percent by weight.

EXAMPLE 2

The following example illustrates that the catalysts of the present invention maintain their aromatization activity over extended periods of time as compared to a catalyst supported on 100 percent alumina.

Figure 2:
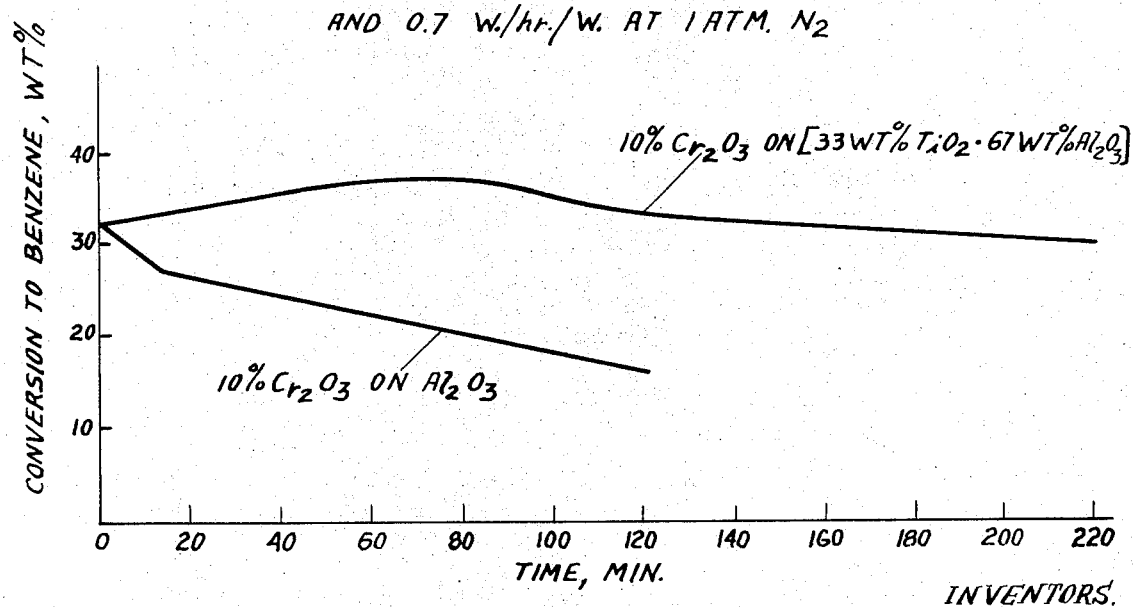
FIG. 2 is a graph comparing the variation in conversion to benzene in a hexene-1 aromatization with increasing time with a catalyst comprising chromia supported on 100 percent $Al_2O_3$ and a catalyst comprising chromia supported on [33 wt.% $TiO_2$ 67 wt.% $Al_2O_3$].

Catalysts having the following compositions:

1 % Cr$_2$O$_3$ on 100% Al$_2$O$_3$
10% Cr$_2$O$_3$ on [33% TiO$_2$.67% Al$_2$O$_3$]

were prepared and evaluated for the aromatization of hexene-1 over an extended period of time following the procedure described in Example 1. As shown in FIG. 2, the catalyst containing 33% titania exhibited conversions to benzene of over about 30 percent with little deactivation over a four hour reaction period. In fact, during the first hour, the catalyst activity increased. With the titania-free catalyst, deactivation was continuous and rapid. At the end of two hours, the conversion to benzene was only about 50 percent of the initial value.

What is claimed is:

1. A process for converting hydrocarbons to aromatic compounds comprising contacting a hydrocarbon feed stock comprising olefins, paraffins, cycloolefins, cycloparaffins or mixtures thereof with a catalyst comprising from about 0.5 to about 30 wt. %, based on total catalyst, of a Group VIB metal oxide impregnated substantially on the surface of a support comprising a mixture of from about 15 to 50 wt. % titania and at least about 20 wt. % alumina, each based upon the weight of the support, in a reaction zone at a temperature ranging from about 400° to about 1200°F.

2. The process of claim 1 wherein said contacting is conducted at pressures ranging from about 0 to about 300 psig.

3. Process as defined in claim 2 wherein a hydrogen partial pressure of from about 0 to about 300 psig. is maintained within the reaction zone.

4. The process of claim 2 wherein said contacting is conducted at a temperature varying from about 800° to 1000°F.

5. The process of claim 3 wherein said contacting is conducted at a pressure varying from about 0 to 50 psig.

6. The process of claim 1 wherein said contacting is conducted in the presence of a catalyst comprising from about 0.5 to 15 wt. % chromia, based on total catalyst, said chromia impregnated substantially on the surface of a support comprising from 15 to 50% by wt. titania and at least about 20 wt. % alumina, each based on the weight of the support.

7. The process of claim 1 wherein said catalyst comprises from about 0.5 to about 15 wt. %, based on total catalyst, of chromium oxide impregnated on a support comprising a mixture of from about 15 to 50 wt. % titania, based on the weight of the support, and the balance alumina.

8. The process of claim 1 wherein said feed stock comprises an olefinic aliphatic hydrocarbon having one or more ethylenic sites of unsaturation and having from about 6 to 18 carbon atoms.

9. The process of claim 1 wherein said feed stock is substantially sulfur free.

10. The process of claim 1 wherein the catalyst comprises from about 0.5 to about 30 wt. %, based on total catalyst, of a Group VIB metal oxide impregnated on a support comprising a mixture of from about 15 to 50 wt. % titania, based on the weight of the support, and the balance, alumina.

11. A process for converting hydrocarbons to aromatic hydrocarbons comprising contacting a hydrocarbon feed stock comprising olefins, paraffins, cycloolefins, cycloparaffins or mixtures thereof, with a catalyst comprising from about 0.5 to about 15 wt. %, based on total catalyst, of chromium oxide impregnated on a support comprising a mixture of from about 15 to 50 wt. % titania and at least about 20 wt. % alumina, each based upon the weight of the support, in a reaction zone at a temperature ranging from about 800° to about 1000°F.

12. The process of claim 1 wherein said contacting is conducted in the presence of hydrogen.

13. The process of claim 1 wherein said support is a mixture of from about 15 to 50 wt. % titania, based on the weight of the support, and the balance, alumina.

14. The process of claim 1 wherein said support is a mixture of from about 25 to 35 wt. % titania, based on the weight of the support, and the balance, alumina.

15. The process of claim 1 wherein said feed stock comprises an olefinic aliphatic hydrocarbon having one or more ethylenic sites of unsaturation and having from about 6 to 18 carbon atoms.

16. The process of claim 1 wherein said feed stock is substantially sulfur free.

17. The process of claim 13 wherein said feed stock comprises an olefinic aliphatic hydrocarbon having one or more ethylenic sites of unsaturation and having from about 6 to 18 carbon atoms.

18. The process of claim 17 wherein said feed stock is substantially sulfur free.

19. The process of claim 1 wherein said contacting is conducted at pressures ranging from about 0 to about 300 p.s.i.g.

* * * * *